(No Model.)
C. A. SELLON.
SAFETY SHAFT COUPLING.
No. 514,384. Patented Feb. 6, 1894.
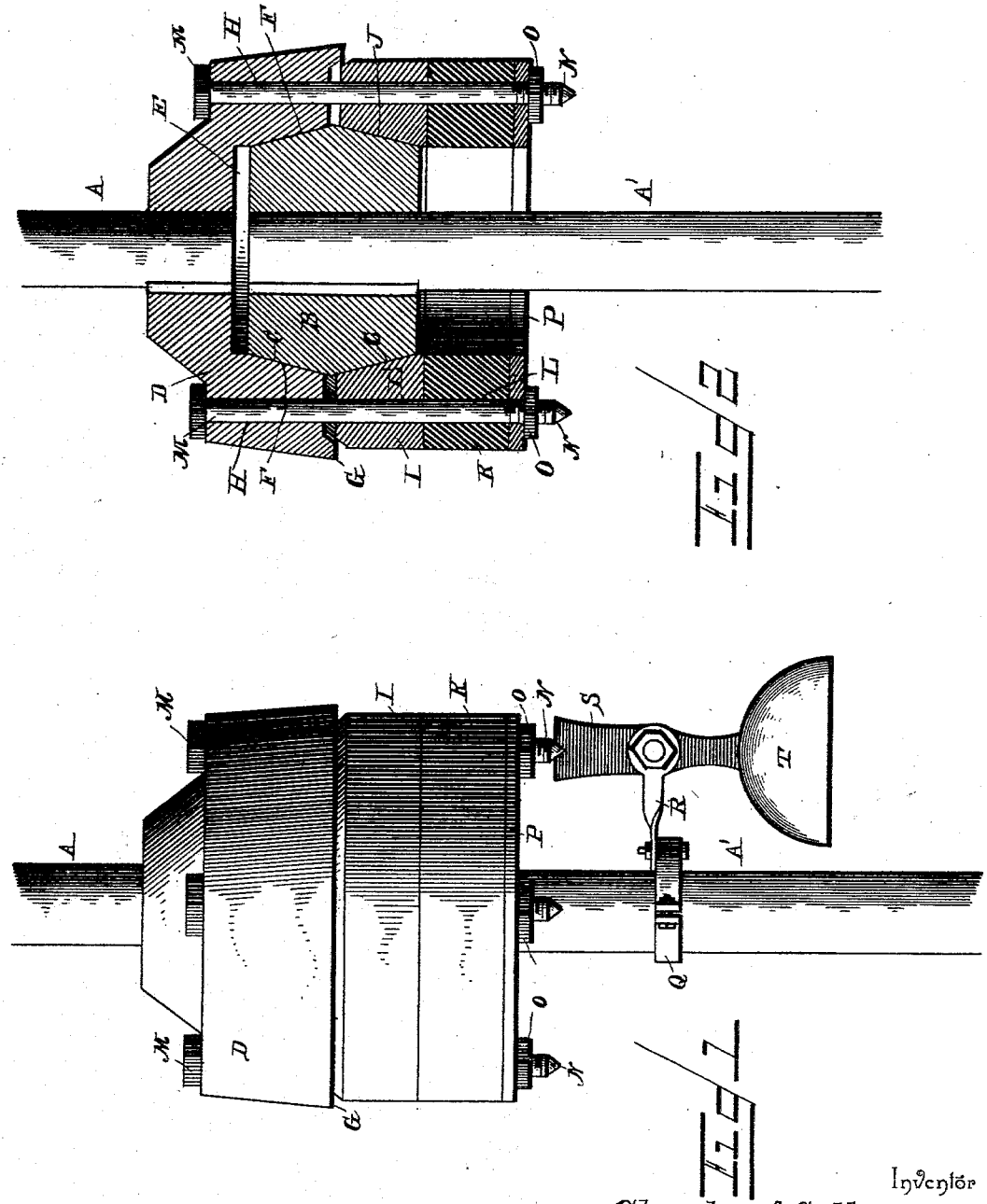
Witnesses
W. E. Schneider
D. C. _____
Inventor
Charles A. Sellon.
By his Attorneys,
C. A. Snow & Co.

UNITED STATES PATENT OFFICE.

CHARLES A. SELLON, OF PIKE, NEW YORK, ASSIGNOR OF ONE-HALF TO WILLIAM C. SMITH, OF SAME PLACE.

SAFETY SHAFT-COUPLING.

SPECIFICATION forming part of Letters Patent No. 514,384, dated February 6, 1894.

Application filed July 29, 1893. Serial No. 481,849. (No model.)

*To all whom it may concern:*

Be it known that I, CHARLES A. SELLON, a citizen of the United States, residing at Pike, in the county of Wyoming and State of New York, have invented a new and useful Safety Shaft Coupling or Clutch, of which the following is a specification.

This invention relates to safety shaft couplings or clutches; and it has for its object to provide an improved shaft coupling or clutch of that character adapted to couple together two adjacent shaft ends, so that motion may be readily communicated from a driving power to any suitable machinery, while at the same time providing a coupling which will slip upon any tendency of the machinery to clog, thereby saving the same from breakage.

To this end the main and primary object of the present invention is to provide an improved slip shaft coupling especially adapted for use in connection with shafts running grinding mills, in which stones or hard substances are frequently present and which very often cause a sudden stopping and breakage of the machinery, and in this connection the herein described coupling or clutch provides for the free running of the machinery while working normally, but which allows such machinery to stop at once when any hard foreign substances become lodged therein. The coupling or clutch is also well adapted for use in connection with flexible boring shafts and in fact with all classes of machinery in which clogging or interference with the free operation thereof is likely to occur, and in these several uses specifically noted the coupling or clutch is combined with an alarm device which at once indicates to the operator that the coupling has slipped and the machinery therefore is not running.

With these and other objects in view which will readily appear as the nature of the invention is better understood, the same consists in the novel construction, combination and arrangement of parts hereinafter more fully described, illustrated and claimed.

In the accompanying drawings:—Figure 1 is a side elevation of an improved shaft coupling and the alarm device therefor constructed in accordance with this invention. Fig. 2 is a central vertical sectional view of the same showing it coupling the adjacent ends of two vertical shafts together.

Referring to the accompanying drawings, A A', represent two adjacent shafts which are in vertical alignment and the ends of which terminate short of each other in order to permit the ready coupling of the extremities of such shafts together by means of the herein-described coupling.

Securely keyed or fixedly fastened on the extremity of the shaft end A', is the double cone coupling block or head B, provided with the oppositely beveled or tapered sides C, which are beveled both ways from the center of said block or head to the opposite ends thereof in order to provide means for gripping the block or head from both sides thereof, and one side of the double cone coupling block or head is adapted to be frictionally engaged by the clutch-collar D. The clutch collar D, is keyed or otherwise fixedly mounted on the extremity of the shaft end A, in alignment with the shaft end A', and said clutch collar is provided at one side thereof with a clutch socket E, having tapered or beveled sides F, adapted to fit one of the beveled sides of the double cone coupling block or head B, which fits into the socket of the collar D, and the latter is further provided at one edge thereof with the circumferential drip lip G, which projects downwardly from the edge of the collar and prevents oil and water from finding access to the interior of the coupling and therefore interfering with the free working thereof. The said clutch collar D, is further provided with a series of bolt openings H, formed near the outer edge thereof.

Loosely arranged over the shaft ends A' at one side of the block or head B, is the lower coupling ring I, of a less diameter than the collar D, to permit the lip G, to project beyond the ring, and the latter is provided with a central tapered or beveled opening J, which is adapted to fit the beveled side or face of the block or head opposite the side engaged by the collar D. A thickened elastic or flexible ring K, loosely embraces the shaft end A', at one side of the ring I, to hold the same into engagement with one side of the block or head B, and is provided with bolt openings L, aligning with similar openings L', in the ring I, and the bolt openings H, in the clutch collar D, and the aligned bolt openings are adapted to receive the coupling bolts M, having projecting threaded extremities N, engaged by the nuts O, which work against one side of a metallic washer ring P, fitting at one side of the flexible ring K, to prevent the indenting thereof by the nuts O. It will be apparent that the ring K, which is preferably of rubber or other similar material may be substituted by spiral springs arranged on the lower ends of the bolts M, although the construction described is that preferably employed by me. After assembling the several parts of the coupling together, the bolts M, may be tightened sufficiently so that the collar D, and the ring I, will grip the block or head B, sufficiently tight so that motion will be transmitted from one of the shafts to the others under ordinary circumstances, but not tight enough to operate as a clutch when any abnormal strain is placed on one of the shaft sections by reason of a clogging of the machine. The bolts M, may be loosened in order to permit either of the shaft ends to revolve independently of the other when it is not desired to run the machinery driven from one of such shafts.

A sectional clamp collar Q, is fastened to the shaft section A', below the coupling and has bolted to one side thereof one end of a twisted spring arm R, to the other end of which is fastened the bell arm S, of an ordinary alarm bell T, fastened to one end of such arm and carrying the usual clapper or hammer (not shown), which will sound an alarm when the bell is put into vibration. The upper end of the bell arm S, projects in the path of the projecting extremities N, of the coupling bolts M, so that when the coupling slips, due to the clogging of the machinery or on account of the coupling bolts not being sufficiently tight, the said ends N, of the said bolts will engage or contact with the bell arm and cause the bell to vibrate and give an alarm indicating the slipping of the coupling.

Changes in the form, proportion and the minor details of construction may be resorted to without departing from the principle or sacrificing any of the advantages of this invention.

Having thus described the invention, what is claimed, and desired to be secured by Letters Patent, is—

1. In a slip shaft coupling, the combination with abutting shafts; of a solid double cone coupling block secured fast to one of the shaft ends, a clutch collar mounted fast on the other shaft end and having a tapered socket in one side thereof adapted to register with one of the beveled sides of the coupling block or head and to inclose the same therein, a coupling ring having a central tapered opening adapted to engage over the opposite beveled side of the coupling block or head, a thickened elastic or flexible ring arranged against the outer side of said coupling ring and bolts connecting the clutch collar coupling ring and elastic ring so as to bind the block and coupling ring tightly on both beveled sides of the block or head and to inclose the same therebetween and therein, substantially as set forth.

2. In a safety alarm shaft coupling, the combination with abutting shafts and the coupling devices having projecting portions at one end, and a vibrating alarm bell having an arm lying in the path of said projecting portions, and a spring arm attached at one end to the bell arm and clamped at its other end onto one of the shaft ends, substantially as set forth.

3. In a safety alarm shaft coupling, the combination with abutting shafts and the slip coupling device having coupling bolts provided with ends projecting at one side of the coupling, a twisted spring arm clamped to one of the shaft ends, and a vibrating alarm bell arm fastened to one end of said twisted spring arm and adapted to have its other end project in the path of said projecting bolt ends, substantially as set forth.

4. In a shaft coupling, the combination with abutting shafts; of a double cone coupling block secured to one of the shaft ends, a clutch collar secured to the other shaft end and having a tapered socket at one side which fits one of the beveled sides of the coupling block or head, a projecting drip lip at one edge, and bolt openings, a coupling ring having a central tapered opening adapted to engage the opposite beveled side of the coupling block or head, and bolt openings aligning with those of the clutch collar, an elastic or flexible ring located at one side of the coupling ring, a washer ring fitting one side of said elastic or flexible ring, and coupling bolts engaging the aligned bolt openings, the elastic or flexible ring and the washer, substantially as set forth.

In testimony that I claim the foregoing as my own I have hereto affixed my signature in the presence of two witnesses.

CHARLES A. SELLON.

Witnesses:
E. S. WHITE,
C. C. LATHROP.